United States Patent
Gamage et al.

(10) Patent No.: US 7,998,777 B1
(45) Date of Patent: Aug. 16, 2011

(54) METHOD FOR FABRICATING A SENSOR

(75) Inventors: Sisira Kankanam Gamage, Palo Alto, CA (US); Naresh Venkata Mantravadi, San Jose, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/968,346

(22) Filed: Dec. 15, 2010

(51) Int. Cl.
*H01L 21/00* (2006.01)
*G01L 9/00* (2006.01)

(52) U.S. Cl. ............ 438/53; 438/50; 438/51; 257/419; 257/E27.006; 73/715; 73/721; 73/727; 73/754

(58) Field of Classification Search ............... 438/50, 438/51, 53; 257/E27.006, 419; 73/721, 715, 73/727, 754
See application file for complete search history.

(56) References Cited

U.S. PATENT DOCUMENTS

| | | | |
|---|---|---|---|
| 4,525,766 A | 6/1985 | Petersen | |
| 6,338,284 B1 | 1/2002 | Najafi et al. | |
| 7,493,822 B2 * | 2/2009 | Stewart et al. | 73/721 |
| 7,622,782 B2 | 11/2009 | Chu et al. | |
| 2007/0052046 A1 * | 3/2007 | Chu et al. | 257/415 |
| 2010/0219490 A1 * | 9/2010 | Adachi et al. | 257/418 |

FOREIGN PATENT DOCUMENTS

| | | |
|---|---|---|
| EP | 302654 A2 | 2/1989 |
| EP | 0336437 A2 | 10/1989 |
| WO | 2007117198 A1 | 10/2007 |

\* cited by examiner

*Primary Examiner* — Andy Huynh
*Assistant Examiner* — Aaron A Dehne
(74) *Attorney, Agent, or Firm* — Mark A. Conklin; GE Global Patent Operation

(57) ABSTRACT

A method for fabricating a sensor is disclosed that in one embodiment bonds a first device wafer to an etched second device wafer to create a suspended structure, the flexure of which is determined by an embedded sensing element that is in electrical communication with an outer surface of the sensor through an interconnect embedded in a device layer of the first device wafer. In one embodiment the suspended structure is enclosed by a cap and the sensor is configured to measure absolute pressure.

20 Claims, 6 Drawing Sheets ated herein, since modifications within the spirit and scope of the invention will occur to those skilled in the art. Accordingly,

METHOD FOR FABRICATING A SENSOR

BACKGROUND OF THE INVENTION

The subject matter herein relates generally to semiconductor microelectromechanical (MEMS) based sensor configurations that can be used to detect small forces or flexures generated from mechanical stress, chemo-mechanical stress, thermal stress, electromagnetic fields, and the like. More particularly, the subject matter disclosed herein relates to a MEMS based pressure sensor and a method for fabricating the same.

Advances in semiconductor microelectronic and MEMS based sensors have served greatly to reduce the size and cost of such sensors. The electrical and mechanical properties of silicon microsensors have been well chronicled. Silicon micromachining and semiconductor microelectronic technologies have blossomed into a vital sensor industry with numerous practical applications. For instance, micromachined silicon pressure sensors, acceleration sensors, flow sensors, humidity sensors, microphones, mechanical oscillators, optical and RF switches and attenuators, microvalves, ink jet print heads, atomic force microscopy tips and the like are widely known to have found their way into various applications in high volume medical, aerospace, industrial and automotive markets. The high yield strength, elasticity at room temperature, and hardness properties of silicon makes it an ideal base material for resonant structures that may, for example, be useful for electronic frequency control or sensor structures. Even consumer items such as watches, scuba diving equipment and hand-held tire pressure gauges may incorporate silicon micromachined sensors.

The demand for silicon sensors in ever expanding fields of use continues to fuel a need for new and different silicon microsensor geometries and configurations optimized for particular environments and applications. Unfortunately, a drawback of traditional bulk silicon micromachining techniques has been that the contours and geometries of the resulting silicon microstructures have been significantly limited by the fabrication methods. For instance, etching silicon structures with conventional etching techniques is constrained, in part, by the crystal orientations of silicon substrates, which limits the geometry and miniaturization efforts of many desired structures.

The increasing use of microsensors to measure pressure has spurred the development of small silicon plate structures used, for example, as capacitors and to produce electrostatic forces. For instance, there exist microsensors that measure capacitance using an array of interdigitated polysilicon plates. Similarly, there exist microsensors that produce electrostatic forces using an array of layered plates. Further, there exist microsensors that measure the flexure, or bending, of silicon structures in response to forces such as pressure or acceleration.

The expanding fields of use for microelectromechanical devices in general, and pressure sensors in particular, has created a demand for ever smaller devices. Unfortunately, there has been difficulty producing smaller devices that are also highly sensitive to small changes in pressure. Because of the small size of the devices and the thin nature of the geometries used, it is difficult for conventional techniques to maintain the stringent tolerances required.

It would be advantageous to provide a method for manufacturing highly sensitive pressure sensors that are not only small in size, but which can be effectively produced in high volume.

BRIEF DESCRIPTION OF THE INVENTION

A method for fabricating a sensor is disclosed, in one embodiment comprising the steps of forming an interconnect window in a top surface of a first device layer of a first device wafer, the first device wafer comprising a first device layer, a first insulator layer, and a first handle layer, the first insulator layer located between the first device layer and the first handle layer, placing an interconnect in the first device layer, the interconnect comprising spaced apart inner and outer interconnects extending along the first device layer adjacent the top surface of the first device wafer, a lower interconnect located adjacent a portion of the interconnect window, an interconnect feedthrough connecting the inner interconnect and the lower interconnect, and an outer interconnect feedthrough connecting the outer interconnect and the lower interconnect, forming a diaphragm cavity in a top surface of a second device layer of a second device wafer, bonding the top surface of said first device layer to the top surface of the second device layer forming a diaphragm over the diaphragm cavity, removing the first handle layer and the first insulator layer from the first device wafer, placing a sensing element in the first device layer proximate the diaphragm to sense flexure in the diaphragm, and bonding a cap over the diaphragm between the inner and outer interconnects.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

An exemplary micromachined pressure sensor can be made by forming a cavity within a silicon structure and a diaphragm adjacent to the cavity. In absolute pressure sensor embodiments, in which measurements are made in relation to a selected reference pressure, the cavity can be held in a vacuum or a selected internal pressure. The pressure sensor measures pressure by sensing the flexure of the diaphragm, for example how the pressure acting on the back side of the diaphragm deflects the diaphragm towards a pressure chamber having a reference pressure formed by a cap placed over the diaphragm. One or more sensing elements formed near the edges of the diaphragm typically sense the flexure or deflection of the diaphragm.

Figure 1:
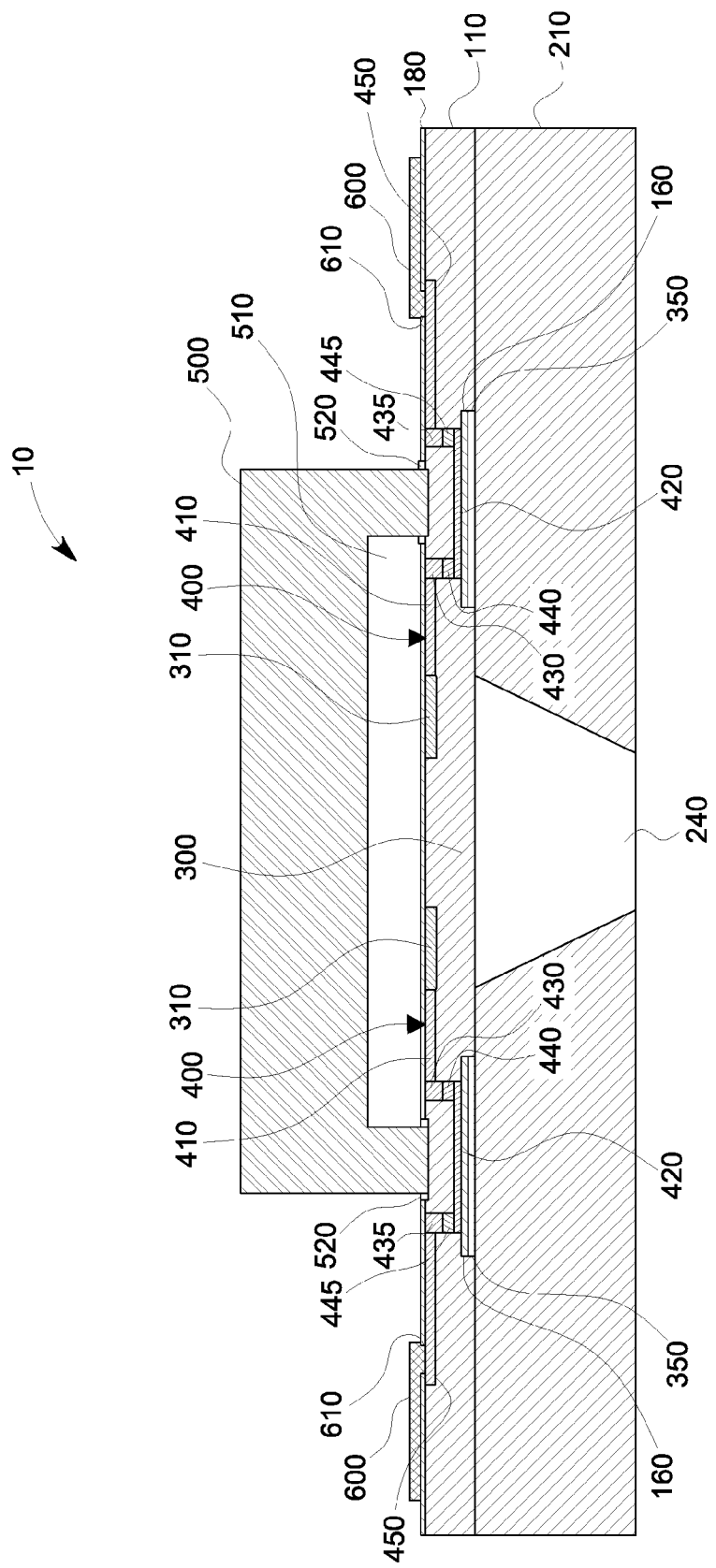
FIG. 1 is a cross sectional view of an exemplary sensor in one embodiment of the invention.
Figure 2:
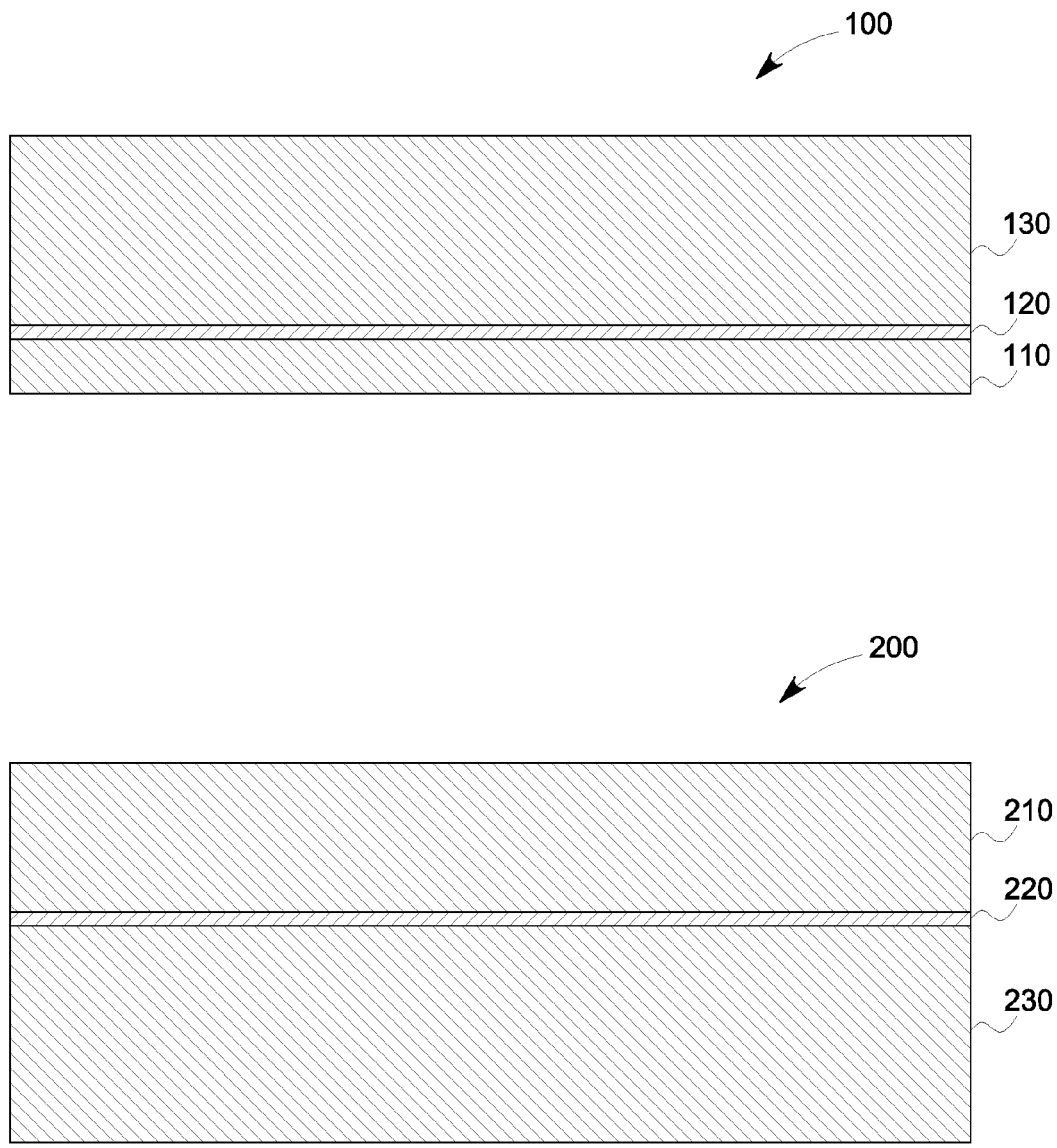
FIG. 2 is a cross sectional view of two exemplary silicon on insulator device wafers used to fabricate a sensor in one embodiment of the invention.

FIG. 1 is an exemplary cross sectional view of a sensor 10 in one embodiment of the invention. Sensor 10 can be manufactured using two wafers that are processed and bonded together, for example two silicon on insulator (SOI) semiconductor wafers, an SOI wafer and a double side polished (DSP) semiconductor wafer, or two DSP wafers of which one is an epiwafer. FIG. 2 shows two exemplary starting wafers in one embodiment of the invention. First and second device wafers 100 and 200, respectively, can be SOI wafers having first and second device layers 110 and 210, first and second insulator layers 120 and 220, and first and second handle layers 130 and 230, respectively. First device layer 110 can be a single crystal silicon substrate which, in one embodiment, can have n-type doping and be of a suitable thickness to meet the operational and physical design characteristics of the sensor 10. Second device layer 210 can be a single crystal silicon substrate which, in one embodiment, can be a thickness selected to meet particular design specifications, and which can have n-type or p-type doping. The thickness of the various layers of the SOI wafer can be precisely set using conventional SOI chip manufacturing techniques, and can be selected such that the precise thickness of the layers determine the subsequent operating and physical characteristics of the sensor 10, as will be described below. First and second insulator layers 120 and 220 can, in one embodiment, be silicon dioxide and be of a suitable thickness to meet the manufacturing and design requirements of the sensor 10. First and second handle layers 130 and 230 can be used to grip the first and second device wafers 100 and 200, respectively, during the manufacturing process, and can be located such that the first and second insulator layers 120 and 220 are positioned between the first and second device layers 110 and 210 and the first and second handle layers 130 and 230, respectively. First and second handle layers 130 and 230 can consist of, for example, n-type or p-type silicon and be of a suitable thickness to meet the design and manufacturing requirements of the sensor 10. In one embodiment, second device wafer 200 can be a double side polished silicon wafer which, in one embodiment, can have n-type or p-type doping and be of a suitable thickness to meet the design and manufacturing requirements of the sensor 10. Together, the thicknesses of the various layers comprising the sensor 10 can be selected such that the overall thickness of the device meets the operational and physical design characteristics of the sensor 10.

With reference again to FIG. 1, sensor 10 can be comprised of first device layer 110 and second device layer 210. One or more sensing elements 310, for example p-type piezoresistive sensing elements, can be strategically implanted or diffused within the first device layer 110 to sense flexure in the silicon structures, in particular a diaphragm 300 suspended over an open diaphragm cavity 240 within the sensor 10. Sensor 10 can also include sensor passivation layer 180 and upper device passivation layer 160 that can consist of, for example, a silicon dioxide layer, a silicon nitride layer, or a combination of both. Sensor passivation layer 180 can provide electrical insulation and protection to sensor 10 during manufacturing and operation. One or more interconnects 400 formed in first device layer 110 can electrically couple one or more sensing elements 310 to an external surface of the sensor 10, while one or more metallization layers 600 can provide electrical connectivity between the interconnects 400 and an external contact on the sensor 10 such that the sensor 10 can be electrically coupled to other devices or connections through, for example, a lead attachment. The portion of upper device passivation layer 160 that is located within the interconnect windows 350 can function to safeguard those portions of the first device layer 110 that will become the lower interconnects 420 during manufacturing, as described below. A cap 500 bonded to first device layer 110 forms a pressure chamber 510 above the diaphragm 300, the pressure inside of which can be arbitrarily chosen to meet design and performance specifications.

With reference to FIG. 1, an exemplary sensor 10 and operation thereof is described in one embodiment of the invention. Sensor 10 can operate by measuring flexure in a thinned structure or diaphragm 300 formed in first device layer 110 over a diaphragm cavity 240 formed in second device layer 210, which can be bonded to first device layer 110. The diaphragm 300 can serve as a flexure structure in sensor 10. As the pressure below diaphragm 300 changes, diaphragm 300 will flex towards or away from the diaphragm cavity 240 in relation to the pressure within the pressure chamber 510. Diaphragm 300 will flex in relation to the diaphragm cavity 240 in a predictable way from pressure exerted on the diaphragm 300. The flexure in diaphragm 300 can be detected by one or more sensing elements 310 formed in first device layer 110 on or near the edges of diaphragm 300. In one embodiment using piezoresistive sensing elements, the resistance of sensing element 310 can be determined via a circuit, such as a wheatstone bridge circuit or the like, interconnected using one or more interconnects 400 attached to one or more metallization layers 600. An electrical interface or other such device can be attached to the ends of the metallization layers 600 to place the sensor 10 in electrical communication with another device. The resistance of the piezoresistive sensing element 310 varies with the flexure of diaphragm 300. Thus, measurement of the piezoresistive resistance of sensing element 300 can be used to determine the amount of flexure in diaphragm 300, and thereby determine the pressure exerted on the sensor.

Figure 3:
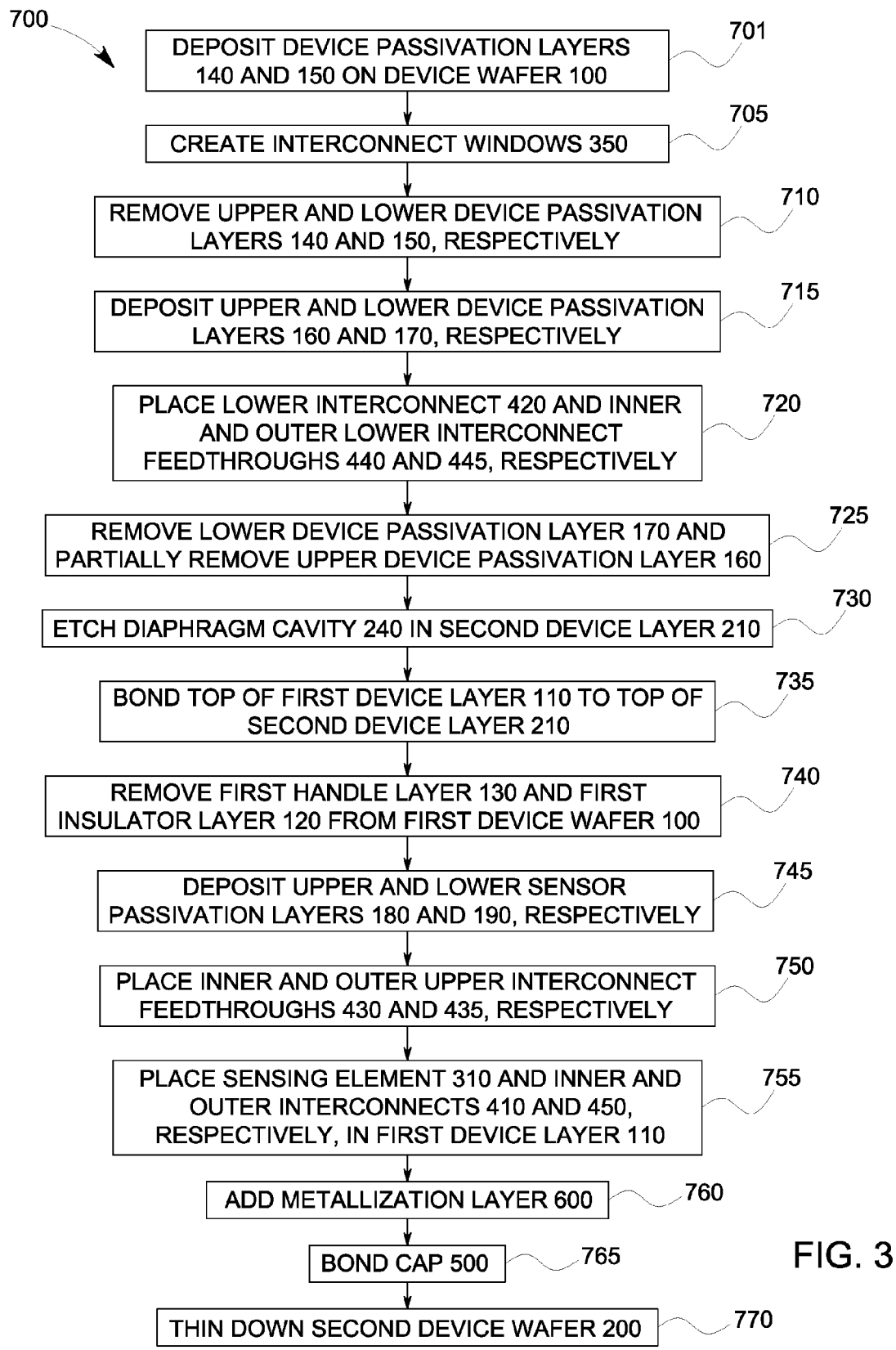
FIG. 3 is an exemplary process flow for fabricating a sensor in one embodiment of the invention.
Figure 4:
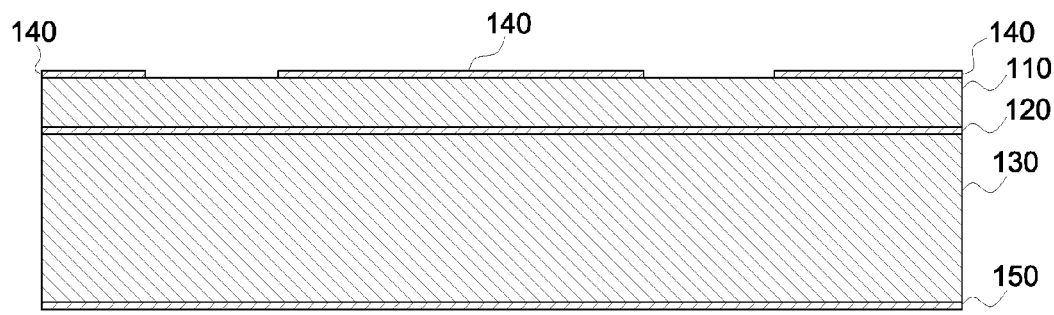
FIG. 4 is an exemplary cross sectional view of a first device wafer with etched passivation layers in one embodiment of the invention.

An exemplary process for fabricating a silicon sensor like the one illustrated in FIG. 1 is explained with reference to FIGS. 1 through 8. FIG. 3 is an exemplary process flow 700 for fabricating a sensor 10 in one embodiment of the invention. With reference to FIGS. 3 and 4, in step 701 of FIG. 3, upper and lower device passivation layers 140 and 150, respectively, can be deposited on the upper and lower surfaces of device wafer 100 using, for example, a silicon dioxide layer, a silicon nitride layer, or a combination of both to protect and insulate device wafer 100 during the fabrication process. Next, in step 705 interconnect windows 350, which can be opening, can be formed in the upper passivation layer 140 and extend into first device layer 110. In one embodiment, interconnect windows 350 can be formed in both upper passivation layer 140 and first device layer 110 by using dry or wet etching techniques, for example DRIE, wet etching with KOH or TMAH, or other silicon etchants or the like. In other embodiments, interconnect windows 350 can be formed by wet or dry etching of the upper passivation layer 140 followed by wet or dry oxidation of the first device layer 110 to the desired depth. The oxide grown during oxidation can subsequently be removed using wet or dry removal techniques. Next, in step 710, upper and lower device passivation layers 140 and 150 can be removed using dry or wet etching techniques.

Figure 5:
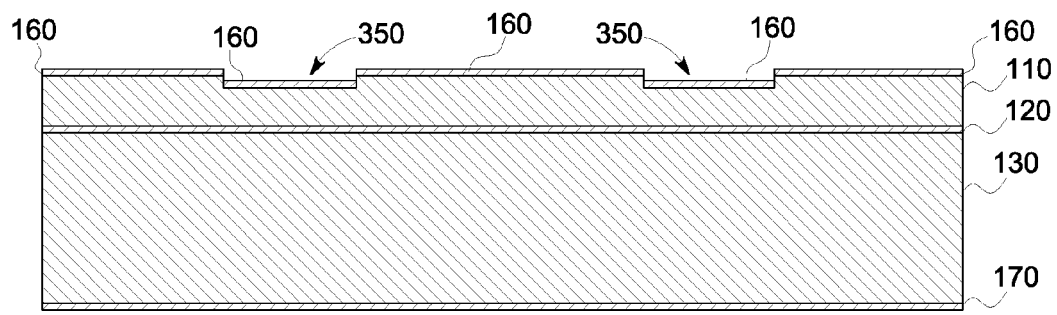
FIG. 5 is an exemplary cross sectional view of a first device wafer with interconnect windows in one embodiment of the invention.

With reference to FIGS. 3 and 5, in step 715 of FIG. 3, upper and lower device passivation layers 160 and 170, respectively, can be deposited on the upper and lower surfaces of device wafer 100 using, for example, a silicon dioxide layer, a silicon nitride layer, or a combination of both. As shown in FIG. 5, passivation 160 can also be deposited on the inner surface of the interconnect windows 350.

Figure 6:
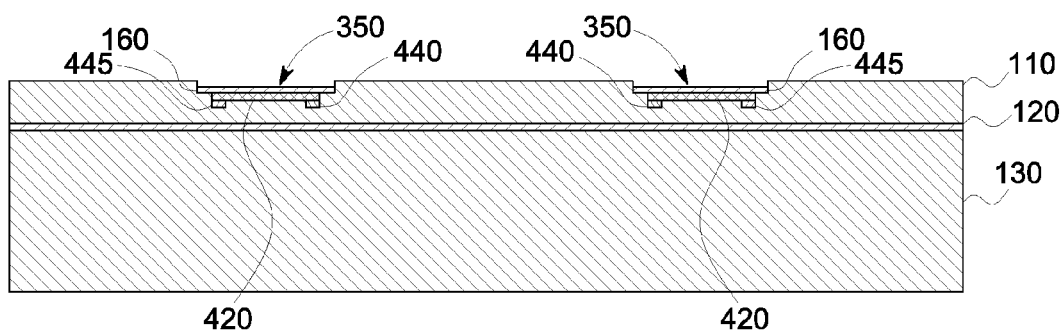
FIG. 6 is an exemplary cross sectional view of a first device wafer with interconnect windows, lower interconnect, and inner and outer lower interconnect feedthroughs in one embodiment of the invention.

With reference to FIGS. 3 and 6, in step 720 both a lower interconnect 420, an inner lower interconnect feedthrough 440, and an outer lower interconnect feedthrough 445 can be formed, in one embodiment, by diffusing or implanting highly doped p-type dopant into the first device layer 110 with a subsequent anneal at 800 to 1200 degrees Celsius. In one embodiment, lower interconnect 420, inner lower interconnect feedthrough 440 and outer lower interconnect 445 are formed using a single process, while in other embodiments, they can be formed using individual steps and techniques. Next, in step 725, the lower device passivation layer 170 and the portion of the upper device passivation layer 160 located outside of the interconnect windows 350 can be removed using wet or dry etching techniques.

Figure 7:
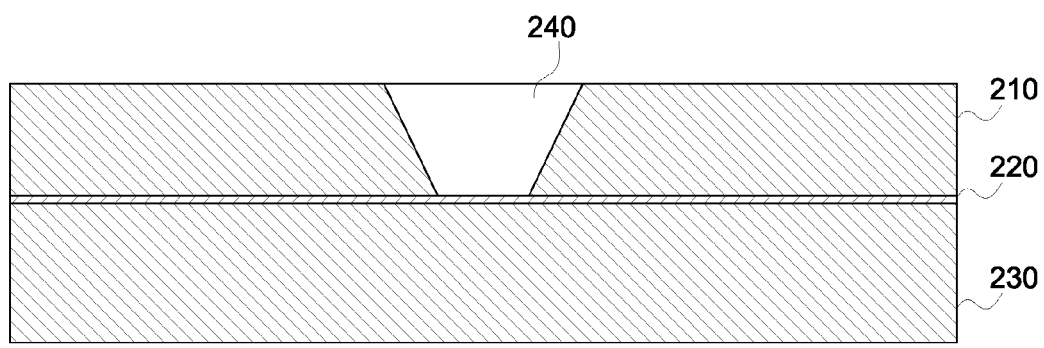
FIG. 7 is an exemplary cross sectional view of a second device wafer with diaphragm cavity in one embodiment of the invention.

With reference to FIGS. 3 and 7, in step 730 diaphragm cavity 240 is etched into the top surface of the second device layer 210. Diaphragm cavity 240 can be etched directly into the second device layer 210 using DRIE, wet etching with KOH or TMAH, or other silicon etchants or the like. Diaphragm cavity 240 can have various geometries, for example square, rectangular or circular, and can have any required depth to meet the physical and operational design requirements of sensor 10, which can, in turn, depend on the particular application for which sensor 10 is used and/or the chosen thickness of the second device layer 210. The surface of diaphragm cavity 240 can be either bare silicon, oxidized silicon, doped silicon, or it can be coated with any other thin film capable of withstanding subsequent wafer bonding and processing temperatures.

Figure 8:
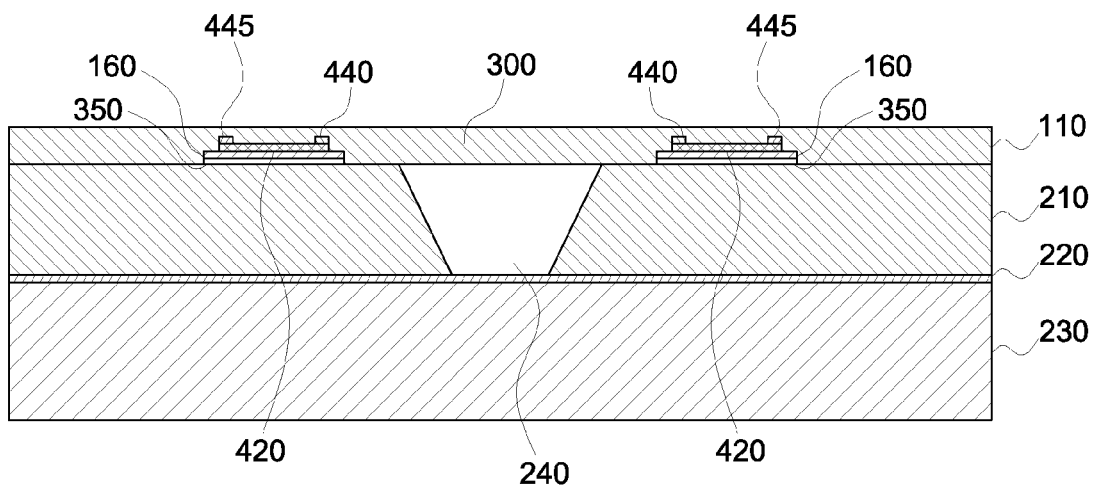
FIG. 8 is an exemplary first device layer of a first device wafer bonded to a second device layer of a second device wafer in one embodiment of the invention.

With reference to FIGS. 3 and 8, in step 735 the exposed top surface of the first device layer 110 is bonded to the exposed top surface of the second device layer 210 using conventional silicon fusion bonding techniques. In one exemplary fusion bonding technique, the opposing surfaces can be made hydrophilic, that is, the surfaces can be treated with a strong oxidizing agent that causes water to adhere to them. The two wafers can then be placed in a high temperature environment to form a bond, the quality of which can be determined by the period of time the wafers are exposed to the high temperature environment. The silicon fusion bonding technique described above bonds first and second device layers 110 and 210, respectively, together without the use of an intermediate adhesive material that could have a different coefficient of thermal expansion than the single crystal silicon wafer. Fusion bonding can also be performed in which oxide layers are formed on the bonded surfaces of one or both of the wafers. In the bonded configuration, the interconnect windows 350 and portion of passivation layer 160 within the interconnect window 350 can act to isolate the interconnects 400 from the second device layer 210.

Next, in step 740 the first handle layer 130 of the device wafer 100 can be removed using a wet etchant, such as KOH or TMAH, that stops on the first insulator layer 120. Additionally, first insulator layer 120 can be removed using wet or dry etching techniques, leaving only the bonded first device layer 110, whose non-bonded top surface is now exposed. In other embodiments, both the first handle layer 130 and the first insulator layer 120 can be removed and/or thinned using physical thinning techniques such as grinding. Additionally, in step 745 upper and lower sensor passivation layers 180 and 190 (190 not shown) can be deposited on the non-bonded top surface of first device layer 110 and the exposed bottom surface of the second handle layer 230 using, for example, silicon dioxide, silicon nitride layers, or combinations of both.

With reference to FIGS. 1 and 3, in step 750, an inner upper interconnect feedthrough 430 and outer upper interconnect feedthrough 435 can be formed, in one embodiment, by diffusing or implanting highly doped p-type dopant into the first device layer 110 with a subsequent anneal at 800 to 1200 degrees Celsius. In one embodiment, inner upper interconnect 430, outer upper interconnect 435, inner lower interconnect feedthrough 440 and outer lower interconnect feedthrough 445, along with inner interconnect 410 and outer interconnect 450, are formed using a single process, while in other embodiments, they can be formed using individual steps and techniques.

In step 755, one or more sensing elements 310 can be placed in the first device layer 110 by diffusion or ion implantation of, in one embodiment using piezoresistive sensing elements, low doped p-type material into the doped n-type first device layer 110 in a predefined position relative to the diaphragm 300, which can be formed as part of the first device layer 110. For example, Boron implantation and diffusion at high temperature may form piezoresistive sensing elements 310 within first device layer 110. The sensing elements 310 can be positioned to sense flexure in diaphragm 300. It should be noted that any number of sensing elements 310 may be employed and their exact positioning relative to the diaphragm 300 may be different depending on the particular application, expected pressures, sensitivity requirements, and the like. Additionally, one or more inner and outer interconnects 410 and 450, respectively, that can provide electrical conductivity to the sensing elements 310 can be added by diffusion or ion implanting of highly doped p-type material into the doped n-type first device layer 110. Inner interconnect 410 can be placed in an overlapping configuration with sensing element 310. The components diffused or implanted in step 755 can be performed using a single process or separately implanted or diffused using multiple processes. Together, inner interconnect 410, lower interconnect 420, inner upper interconnect feedthrough 430, outer upper interconnect feedthrough 435, inner lower interconnect feedthrough 440, outer lower interconnect feedthrough 445, and outer interconnect 450 can be in electrical communication with each other and can comprise interconnect 400. In some embodiments, the individual components that together comprise interconnect 400 can be combined and fabricated as a single component. For example, inner upper interconnect feedthrough 430 and inner lower interconnect feedthrough 440 can be fabricated as a single component to form a single inner interconnect feedthrough, while outer upper interconnect feedthrough 435 and outer lower interconnect feedthrough 445 can be fabricated as a single component to form a single outer interconnect feedthrough. In one embodiment, the different components that together comprise interconnect 400 can be placed within first device layer 110 through a series of non-contiguous steps as described with reference to FIG. 3. In other embodiments, the components that together comprise interconnect 400 can be placed within the first device layer 110 through one or more contiguous steps.

Next, in step 760, metallization layer 600 can be added, providing electrical conductivity from the outer surface of sensor 10 to the sensing elements 310 through interconnects 400. To provide access to the outer interconnects 450, openings can be made in upper sensor passivation layer 180 using dry or wet etching techniques. Metallization layer 600 can then be added and formed of, for example, gold or aluminum, and can be created to a desired thickness to suit device design and fabrication needs.

In step 765, cap 500 can be bonded to the first device layer 110 above the interconnect windows 350. Cap 500 can, in one embodiment, be a prefabricated glass wafer. In other embodiments, cap 500 can be made of silicon. Cap 500 can be bonded to device wafer 110 using a variety of conventional bonding techniques, for example, a glass to silicon electrostatic bond, eutectic bond, or a glass frit bond. In other embodiments, in order to define a bond area, one or more cap etches 520 can be made in the upper sensor passivation layer 180 using wet or dry etch techniques to expose the silicon of first device layer 110. In this embodiment cap 500 can extend through upper sensor passivation layer 180 and directly bond to the first device layer 110 using, for example, an electrostatic bond. Cap 500 can form a pressure chamber 510 above the diaphragm 300 and can additionally protect the diaphragm 300 from environmental hazards.

Finally, in step 770, the second handle layer 230 of the second device wafer 200 can be removed using a wet etchant, such as KOH or TMAH, that stops on the second insulator layer 220. Additionally, second insulator layer 220 can be removed using wet or dry etching techniques, leaving the exposed, non-bonded lower surface of second device layer 210 and exposing diaphragm cavity 240. In other embodiments, both the second handle layer 230 and the second insulator layer 220 can be removed and/or thinned using physical thinning techniques such as grinding. The thickness of second device layer 210 can be further reduced using various wet or dry etching techniques or grinding to meet given design specifications.

With reference to the embodiments described herein, each etch made during the fabrication of sensor 10 can have any chosen geometry and can have any required depth depending on the particular application. Additionally, the etches need not have a single, uniform depth, and the resulting etches can be isotropic or anisotropic. The selected depth and geometry of each etch can be selected to alter the design characteristics of the resulting sensor 10. For example, the thickness of first device layer 110 and the size and shape of the diaphragm 300 dictated by diaphragm cavity 240 can be selected to determine the sensitivity of the resulting sensor 10. The selected thickness of first device layer 110, which can be arbitrarily chosen and precisely controlled in manufacturing the SOI wafers, leads to improved control over the flexibility of diaphragm 300, and therefore improved control over the performance characteristics of the resulting sensor 10. Additionally, the planar manufacturing processes are ideal for manufacturing purposes and can increase not only the fabrication yield, but the overall reliability and long term performance of the resulting devices. Accordingly, uniform control over the performance characteristics of the sensor 10 can be achieved.

The above detailed description is provided to illustrate exemplary embodiments and is not intended to be limiting. Although the method for fabricating a sensor has been shown and described with respect to embodiments which measure pressure, it will be apparent to those skilled in the art that similar techniques can be used to fabricate sensors capable of measuring other parameters. For example, it should be recognized that the apparatus and method of manufacture described herein are useful in a wide variety of other applications not explicitly described herein. It will also be apparent to those skilled in the art that numerous modifications and variations within the scope of the present invention are possible. Further, numerous other materials and processes can be used within the scope of the exemplary methods and structures described as will be recognized by those skilled in the art. For example, it should be recognized that the p-type and n-type materials described herein can be used in an alternative fashion, e.g., by replacing p-type materials for n-type materials and vice versa. Additionally, it will be apparent to those of skill in the art that the sequence of steps identified and described in various exemplary embodiments need not occur in the sequence described, and that in other embodiments various steps can be combined, performed in different orders, either contiguously, non-contiguously, or in parallel, and still achieve the same result.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for fabricating a sensor comprising the steps of:
    forming an interconnect window in a top surface of a first device layer of a first device wafer, said first device wafer comprising said first device layer, a first insulator layer, and a first handle layer, said first insulator layer located between said first device layer and said first handle layer;
    placing an interconnect in said first device layer, said interconnect comprising spaced apart inner and outer interconnects located in said first device layer proximate a portion of said top surface, a lower interconnect located proximate a portion of said interconnect window, an inner interconnect feedthrough connecting said inner interconnect and said lower interconnect, and an outer interconnect feedthrough connecting said outer interconnect and said lower interconnect;
    forming a diaphragm cavity in a top surface of a second device layer of a second device wafer;
    bonding said top surface of said first device layer to said top surface of said second device layer forming a diaphragm over said diaphragm cavity;
    removing said first handle layer and said first insulator layer from said first device wafer;
    placing a sensing element in said first device layer in relation to said diaphragm to sense flexure in said diaphragm; and
    placing a cap over said diaphragm.

2. The method for fabricating a sensor of claim 1, wherein said step of placing an interconnect in said first device layer comprises a plurality of independent, contiguous steps for placing said inner interconnect, outer interconnect, lower interconnect, inner interconnect feedthrough, and outer interconnect feedthrough.

3. The method for fabricating a sensor of claim 1, wherein said step of placing an interconnect in said first device layer comprises a plurality of independent, non-contiguous steps for placing said inner interconnect, outer interconnect, lower interconnect, inner interconnect feedthrough, and outer interconnect feedthrough.

4. The method for fabricating a sensor of claim 1, further comprising the step of forming a metallization layer that provides electrical communication between an outer surface of said sensor and said interconnect.

5. The method for fabricating a sensor of claim 1, wherein said sensing element is a piezoresistive sensing element.

6. The method for fabricating a sensor of claim 1, wherein said second device wafer comprises a double side polished semiconductor wafer.

7. The method for fabricating a sensor of claim 1, wherein said second device wafer comprises a second device layer, a second insulator layer, and a second handle layer, wherein said second insulator layer is located between said second device layer and said second handle layer.

8. The method for fabricating a sensor of claim 7, further comprising the step of removing said second handle layer and said second insulator layer from said second device wafer.

9. The method for fabricating a sensor of claim 1, wherein said sensor measures absolute pressure.

10. The method for fabricating a sensor of claim 1, wherein said cap is glass.

11. A method for fabricating a sensor comprising the steps of:
forming an interconnect window in a top surface of a first device layer of a first device wafer, said first device wafer comprising said first device layer, a first insulator layer, and a first handle layer, said first insulator layer located between said first device layer and said first handle layer;
placing an inner lower interconnect feedthrough and an outer lower interconnect feedthrough below said interconnect window in said first device layer in a spaced-apart configuration;
placing a lower interconnect between said interconnect window and said inner and outer lower interconnect feedthroughs in said first device layer, said lower interconnect being in electrical communication with said inner and outer lower interconnect feedthroughs;
forming a diaphragm cavity in a top surface of a second device layer of a second device wafer;
bonding said top surface of said first device layer to said top surface of said second device layer forming a diaphragm over said diaphragm cavity;
removing said first handle layer and said first insulator layer from said first device wafer;
placing an inner upper interconnect feedthrough and an outer upper interconnect feedthrough between said top surface of said first device layer and said inner and outer lower interconnect feedthroughs, said inner upper interconnect feedthrough being in electrical communication with said inner lower interconnect feedthrough and said outer upper interconnect feedthrough being in electrical communication with said outer lower interconnect feedthrough;
placing a sensing element in said first device layer in relation to said diaphragm to sense flexure in said diaphragm;
placing an inner interconnect in said first device layer in electrical communication with said sensing element and said inner upper interconnect feedthrough;
placing an outer interconnect in said first device layer in electrical communication with said upper outer interconnect feedthrough; and
placing a cap over said diaphragm.

12. The method for fabricating a sensor of claim 11, further comprising the step of forming a metallization layer that provides electrical communication between an outer surface of said sensor and said outer interconnect.

13. The method for fabricating a sensor of claim 11, wherein said sensing element is a piezoresistive sensing element.

14. The method for fabricating a sensor of claim 11, wherein said second device wafer comprises a double side polished semiconductor wafer.

15. The method for fabricating a sensor of claim 11, wherein said second device wafer comprises a second device layer, a second insulator layer, and a second handle layer, wherein said second insulator layer is located between said second device layer and said second handle layer.

16. The method for fabricating a sensor of claim 15, further comprising the step of removing said second handle layer and said second insulator layer from said second device wafer.

17. The method for fabricating a sensor of claim 11, wherein said sensor measures absolute pressure.

18. The method for fabricating a sensor of claim 11, wherein the thickness of said device layer determines the sensitivity of said sensor.

19. The method for fabricating a sensor of claim 11, wherein said cap is glass.

20. The method for fabricating a sensor of claim 11, wherein said steps of placing said sensing element, said inner interconnect, and said outer interconnect are performed at the same time.

* * * * *